United States Patent Office 2,748,129
Patented May 29, 1956

2,748,129

SULFAMYLPIPERAZINES AND METHOD OF PREPARING THE SAME

Corris M. Hofmann, Bound Brook, N. J., assignor to American Cyanamid Company, New York, N. Y., a corporation of Maine No Drawing. Application April 26, 1954,
Serial No. 425,763

4 Claims. (Cl. 260—268)

This invention relates to new organic compounds. More particularly, it relates to N-dialkylsulfamylpiperazines and their preparation.

N-dialkylcarbamylpiperazines in which the other N of the piperazine nucleus is substituted with a heterocyclic radical have been described in United States Patents 2,602,792, 2,519,715 and 2,602,796. The replacement of the carbamyl group with a sulfamyl group, however, results in a new series of compounds with very different properties. The carbamylpiperazines have analgesic properties whereas the 1-dialkylsulfamylpiperazines have anti-convulsant activity. In the 1-dialkylcarbamyl-4-heterocyclic piperazines, if the heterocyclic radical is replaced with an alkyl radical, the compounds continue to exhibit analgesic properties and no anti-convulsant properties.

I have found that the new anti-convulsant compounds which are 1-monocyclic aryl or heterocyclic-4-dialkyl-sulfamylpiperazines described and claimed in our copending application Serial Number 425,764, filed April 26, 1954, can be prepared from the compounds of the present invention having the following general formula:

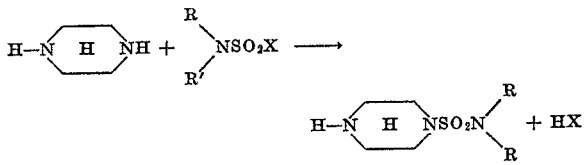

in which R and R' are alkyl radicals. Since the compounds have basic groups present, they may occur in the form of salts.

The new compounds of the present invention are, in general, liquids immiscible with water. In the form of their salts they are soluble in water and almost insoluble in organic solvents.

It is preferred to prepare the compounds of the present invention by the treatment of piperazine with a dialkylsulfamyl halide, generally in the presence of a non-polar solvent such as benzene or a halogenated benzene. This process may be illustrated by the following equation:

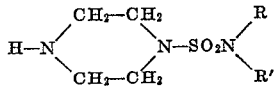

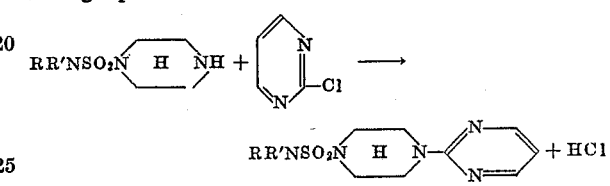

in which R, R' and X are as hereinbefore defined.

The use of an alkaline substance as an acid binding agent in carrying out the process is preferred, although the reaction can take place without the alkaline substance since a basic group is present in the starting compound which could bind the hydrogen halide formed. The alkaline substance can be a compound such as sodium carbonate, triethylamine, trimethylamine, and the like. When an alkaline substance is used it can be removed usually as a by-product by filtration. The solvent is then removed and the crude product obtained. This product may be purified by fractional distillation.

The above mentioned process is preferred because of the availability of starting materials. However, there are a number of general methods which can be used to prepare the compounds of the present invention. For example, a piperazine-1-sulfonyl halide can be reacted with a secondary alkylamine. This process may be illustrated by the following equation:

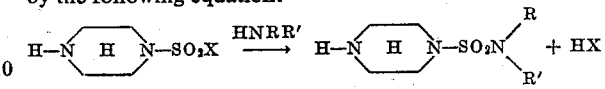

in which X, R and R' are as previously defined.

The final products described in the copending application hereinbefore referred to can be prepared by reacting a 1-dialkylsulfamylpiperazine of the present invention with a heterocyclic halogen compound. This reaction, using chloropyrimidine, may be illustrated by the following equation:

in which R and R' are as hereinbefore defined.

The compounds of the present invention are useful as starting materials for the preparation of the N-substituted N-dialkylsulfamylpiperazines of my copending application.

The following examples describe the preparation of representative 1 - dialkylsulfamylpiperazines within the scope of the present invention.

EXAMPLE 1

*1-dimethylsulfamylpiperazine*

A mixture of 193 parts of piperazine, 79.5 parts of sodium carbonate and 300 parts of chlorobenzene is stirred while 107.6 parts of dimethylsulfamyl chloride are added slowly over a period of about one and one-half hours. The mixture is then stirred and heated at reflux temperature for about eleven hours. The mixture is filtered hot and then cooled and filtered again. The filtrate is distilled at atmospheric pressure to remove the solvent and unreacted piperazine, and then distilled at reduced pressure to obtain the product. The product boils at 141°–145° C./2.5 mm. and solidifies, as soon as it cools, to a nearly white solid melting at about 55° C. The yield is 54% of theory.

EXAMPLE 2

*1-diethylsulfamylpiperazine*

A mixture of 159 parts of sodium carbonate, 387 parts of piperazine and 600 parts of monochlorobenzene is stirred as 257.5 parts of diethylsulfamyl chloride are added. After all the acid chloride has been added, the mixture is reflected about 14 hours. It is then cooled and filtered. The filtrate is distilled at reduced pressure. The first fraction which distills contains chlorobenzene and piperazine. The product distills next with a boiling range of 130°–133° C. at 1 mm. of pressure. There is obtained 262.3 parts of distilled product, representing a 79% theoretical yield.

A mixture of 22.1 parts of 1-diethylsulfamylpiperazine, 11.4 parts of 2-chloropyrimidine, 16.8 parts of sodium bicarbonate and 40 parts of o-dichlorobenzene is refluxed for about six hours. The mixture is then filtered to remove the inorganic salts and the filtrate is evaporated at reduced pressure to remove the solvent. The oily residue is dissolved in ether and treated with ethanol which has been saturated with hydrogen chloride. The product precipitates as a light yellow solid. This solid can be recrystallized from a mixture of 200 parts of acetone and 290 parts of methyl ethyl ketone. The purified material melts at 54°–155° C. and is obtained in a 60% yield.

EXAMPLE 3

*1-dipropylsulfamylpiperazine*

To a mixture of 116 parts of piperazine, 47.7 parts of sodium carbonate and 180 parts of chlorobenzene are added slowly 90 parts of dipropylsulfamyl chloride over a period of about one and one-half hours. The mixture is then stirred and refluxed for about ten hours. The mixture is filtered, and the filtrate is distilled at atmospheric pressure and finally at reduced pressure giving the pure 1-dipropylsulfamylpiperazine as a light amber oil of boiling point 155°–157° C./1.5 mm. in about an 80% yield.

I claim:
1. Compounds of the group consisting of those having the formula:

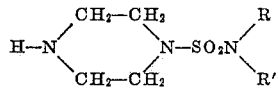

in which R and R' are lower alkyl radicals and therapeutically useful acid salts thereof.
2. 1-diethylsulfamylpiperazine.
3. 1-dimethylsulfamylpiperazine.
4. 1-dipropylsulfamylpiperazine.

References Cited in the file of this patent

Morren et al.: Bull. Soc. Chim. Belges 59, 228–34 (1950).